(12) United States Patent  (10) Patent No.: US 8,243,478 B2
Matthews  (45) Date of Patent: Aug. 14, 2012

(54) METHOD AND APPARATUS FOR LIMITING MAXIMUM OUTPUT POWER OF A POWER CONVERTER

(75) Inventor: David Michael Hugh Matthews, Windsor (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/330,342

(22) Filed: Dec. 19, 2011

(65) Prior Publication Data

US 2012/0087156 A1   Apr. 12, 2012

Related U.S. Application Data

(63) Continuation of application No. 13/025,080, filed on Feb. 10, 2011, now Pat. No. 8,081,496, which is a continuation of application No. 12/422,823, filed on Apr. 13, 2009, now Pat. No. 7,898,826.

(51) Int. Cl.
   *H02M 3/335* (2006.01)

(52) U.S. Cl. ............................ 363/21.17; 363/21.16

(58) Field of Classification Search ............... 363/21.17, 363/21.16, 21.12, 55
See application file for complete search history.

(56) References Cited

U.S. PATENT DOCUMENTS

| 5,343,378 | A | 8/1994 | Tohya |
| 5,652,700 | A | 7/1997 | Tsai et al. |
| 6,249,444 | B1 | 6/2001 | Cross |
| 6,853,563 | B1 * | 2/2005 | Yang et al. ............ 363/21.15 |

* cited by examiner

*Primary Examiner* — Shawn Riley
(74) *Attorney, Agent, or Firm* — Blakely Sokoloff Taylor & Zafman LLP (57) ABSTRACT

An example power converter includes an energy transfer element, a switch, a controller, and a current offset circuit. The controller switches the switch between an ON state and an OFF state to regulate the output of the power converter and is adapted to terminate the ON state of the switch in response to a switch current flowing through the switch reaching a switch current threshold. The current offset circuit is coupled to the input to be directly powered from an input voltage of the power supply. The current offset circuit generates an offset current to flow through the switch only during the ON state of the switch in response to a magnitude of the input voltage. The input current of the power converter is adjusted in response to the offset current.

16 Claims, 8 Drawing Sheets

METHOD AND APPARATUS FOR LIMITING MAXIMUM OUTPUT POWER OF A POWER CONVERTER

CROSS-REFERENCE TO RELATED APPLICATION

This application is a continuation of U.S. patent application Ser. No. 13/025,080, filed Feb. 10, 2011, now pending, which is a continuation of U.S. patent application Ser. No. 12/422,823, filed Apr. 13, 2009, now U.S. Pat. No. 7,898,826. U.S. patent application Ser. Nos. 13/025,080 and 12/422,823 are hereby incorporated by reference.

BACKGROUND INFORMATION

The present invention relates generally to power converters, and more specifically, the invention relates to control circuits that limit a maximum output power of a power converter.

BACKGROUND

Many electrical devices such as cell phones, personal digital assistants (PDA's), laptops, etc. are powered by a source of dc power. Because power is generally delivered through a wall outlet as high-voltage ac power, a device, typically referred to as a power converter or power supply, is required to transform the high ac voltage to low dc voltage to supply electrical power to many electrical devices. In operation, a power converter may use a controller to regulate output power delivered to an electrical device that may be generally referred to as a load. In one instance a controller may control a transfer of energy pulses created by switching a power switch on and off in response to feedback information of an output voltage to keep the output voltage at the output of the power converter regulated.

In certain applications, a power converter may be designed to operate under a wide range of input voltages. Typically, components of power converters are capable of delivering significantly more power when the power converter is coupled to a high ac input voltage than a low ac input voltage. For instance, there may be one application in which the power converter is connected to a load that requires up to 15 W. However the load also may be specified to receive no more than 20 W at any time. In this application, the power converter may be designed to deliver, at most, the maximum power required by the load (15 W) when connected to a relatively low input voltage, for example 85 VAC. However, when the power converter is connected to a higher input voltage, for example, 265 VAC, the power delivered to the output of the power converter may increase to greater than 20 W. This could lead to excess current flowing through the load (electrical device coupled to the power converter) during a fault condition, which could create damage to the electrical circuitry in the load. More specifically, a fault condition may be defined as when the power converter looses ability to regulate. For example, a fault condition may include a situation when the output of the power converter is overloaded.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

DETAILED DESCRIPTION

A method and apparatus to limit the maximum output power of a power converter is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

In short, embodiments of the present invention include a power converter that limits the maximum power delivered to its output under certain conditions to prevent damage to an attached electrical device. Therefore, embodiments of the present invention provide adequate power to the load under one set of input voltage conditions and may also provide limiting the maximum power delivered to the load under a different set of input voltage conditions. That is, a feature of a power converter in accordance with the teachings of the present invention may be used to provide a minimum power delivery capability while limiting the maximum power delivery capability when the power converter is designed to operate over a wide range of input voltage conditions.

Furthermore, a power converter in accordance with the teachings of the present invention may limit the maximum output power without directly measuring the input voltage of the power converter. That is, embodiments disclosed herein include a controller that requires no additional terminals to measure the input voltage nor additional terminals for adjusting a current limit threshold of the controller. Consequently, a power converter designed to operate with multiple ranges of input voltages with a controller that includes a reduced number of terminals translates into reduced costs.

Figure 1A:
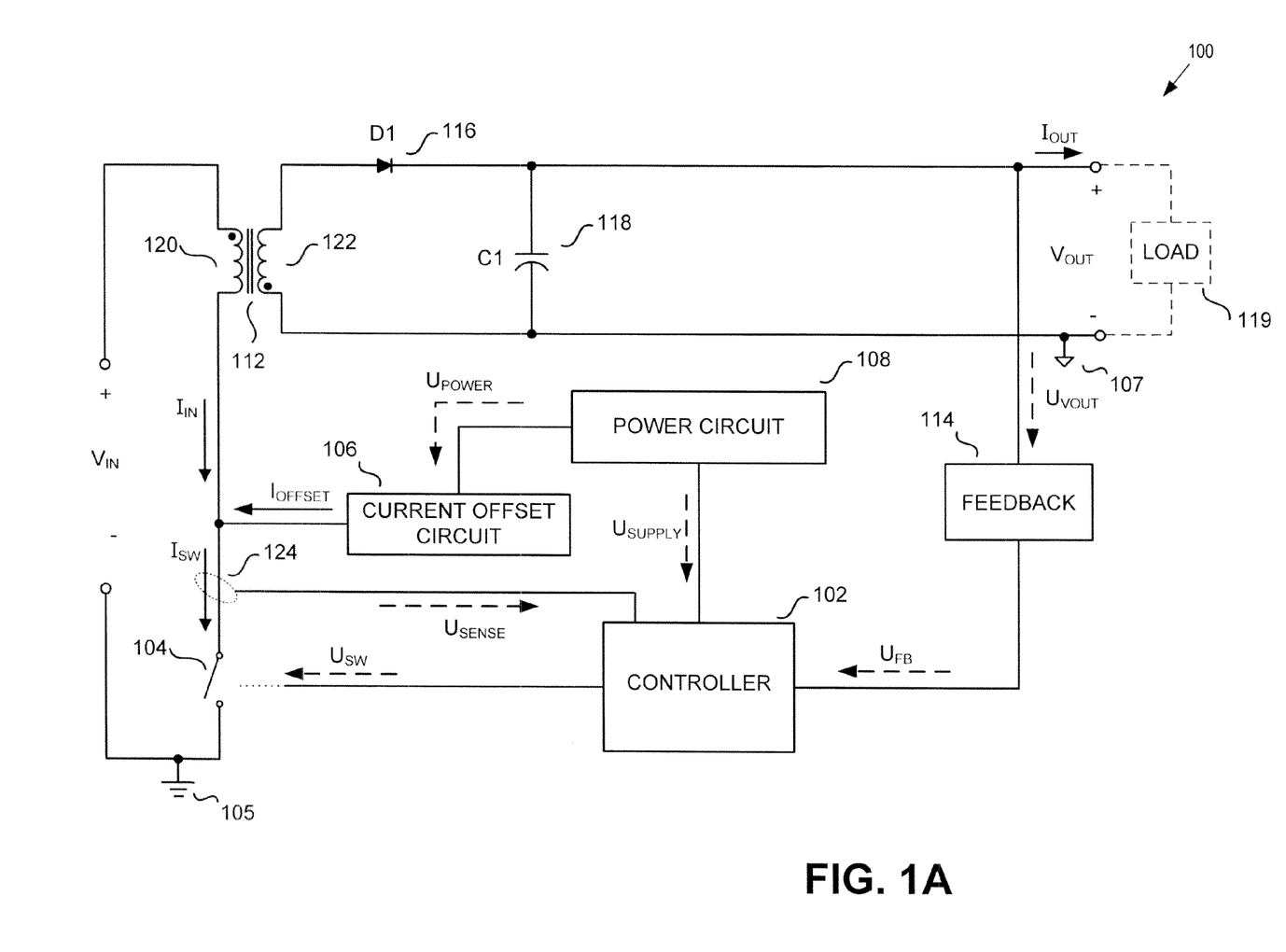
FIG. 1A is a functional block diagram illustrating an example power converter, in accordance with the teachings of the present invention.

FIG. 1A is a functional block diagram illustrating an example of a power converter 100, in accordance with the teachings of the present invention. The illustrated example of power converter 100 includes a controller 102, a power switch 104, a current offset circuit 106, a power circuit 108, an energy transfer element 112, a feedback circuit 114, an output diode 116, an output capacitor 118, and a current sensor 124. In one example power switch 104 is a MOSFET and current sensor 124 is the on resistance of the MOSFET that generates a current sense signal $U_{SENSE}$ that is a voltage generated in response to a current $I_{SW}$ flowing in power switch 104. In operation, power converter 100 provides output power to a load 119 from an unregulated dc input voltage $V_{IN}$. In one example, dc input voltage $V_{IN}$ may be the result of rectifying an ac voltage (not shown) delivered through a wall outlet. As shown, power converter 100 is configured as a flyback converter. In one example, power converter 100 may also be configured as, but not limited to, a forward converter, a buck converter, a buck-boost converter, a SEPIC converter, a Cuk converter, or a flyforward converter. In the example of FIG. 1A, energy transfer element 112 is a coupled inductor, sometimes referred to as a transformer, with input winding 120 and output winding 122. An "input winding" may also be referred to as a "primary winding" and an "output winding" may also be referred to as a "secondary winding." In one example, energy transfer element 112 may be galvanically isolated. More specifically, galvanic isolation prevents dc current from flowing between the input side and the output side of the power converter, and may be required to meet safety regulations. As shown, an input return 105 is electrically coupled to circuitry on the 'input side' of power converter 100. Similarly, an output return 107 is electrically coupled to circuitry on the 'output' side of power converter 100.

In one example, primary winding 120 is coupled to power switch 104 such that, in operation, energy transfer element 112 receives energy with an input current $I_{IN}$ when power switch 104 is in an 'ON' state and energy transfer element 108 delivers energy to the output of power converter 100 when power switch 104 is in an 'OFF' state. During operation, power switch 104 may be switched between the ON state, thereby allowing switch 104 to conduct current, and the OFF state, thereby preventing switch 104 to conduct current. As shown, controller 102 outputs a switching signal $U_{SW}$ to switch power switch 104 between an ON state and an OFF state. In one example, power switch 104 is a metal oxide semiconductor field effect transistor (MOSFET). In another example, controller 102 may be implemented as a monolithic integrated circuit or may be implemented with discrete electrical components or a combination of discrete and integrated components.

During operation of power converter 100, the switching of power switch 104 produces pulsating current in output diode 116 which is filtered by output capacitor 118 to produce a substantially constant output voltage $V_{OUT}$. In one example, the switching of power switch 104 may provide a substantially constant output current $I_{OUT}$ to a load 119 coupled to the output of power converter 100. As shown, feedback circuit 114 is coupled to provide a feedback signal $U_{FB}$ to controller 102. In one example, an output quantity to be regulated by controller 102 and feedback circuit 114 may be output voltage $V_{OUT}$. According to an embodiment of the present invention, feedback circuit 114 may implement an indirect sensing of the output quantity to regulate an output quantity of power converter 100. In one example, a bias winding that is electrically coupled to the 'input side', may be magnetically coupled to the output side of power converter 100 to sense an output quantity at the output of power converter 100. During operation, feedback signal $U_{FB}$ may be representative of an error voltage which may be defined as a difference between an output voltage $V_{OUT}$ and a desired output voltage of power converter 100. n one example, controller 102 includes an oscillator (not shown) that defines substantially constant switching periods $T_S$ during which power switch 104 may be conducting or not conducting. In one example, for power switch 104 to regulate the output voltage $V_{OUT}$, controller 102 determines whether or not the power switch 104 will be allowed to conduct during a switching period $T_S$ in response to the feedback signal $U_{FB}$. A switching period $T_S$ wherein the switch 104 is allowed to conduct is an 'enabled' period. A switching period $T_S$ wherein the switch 104 is not allowed to conduct is a 'disabled' period. In other words, controller 104 decides to either enable or disable power switch 106 during each switching period $T_S$ to control the transfer of energy to the output of power converter 100. In this manner, controller 102 may regulate the output voltage $V_{OUT}$ of power converter 100 in response to feedback signal $U_{FB}$.

As shown in the depicted example, a current sensor 124 is coupled to sense a switch current $I_{SW}$ flowing through power switch 104. More specifically, current sensor 124 may be implemented using a current transformer, or a discrete resistor, or a main conduction channel of a transistor when the transistor is conducting, or a senseFET element forming part of a transistor. During operation, current sensor 124 generates a current sense signal $U_{SENSE}$ that is representative of switch current $I_{SW}$. In one example, current sense signal $U_{SENSE}$ is used by controller 102 to limit switch current $I_{SW}$ in power switch 104 during each switching period $T_S$. In other words, current sense 124 is used to indicate when switch current $I_{SW}$ exceeds a current limit threshold. In this manner, switch 104 is switched from an ON state to an OFF state when the current limit threshold of power switch 104 is reached. That is, the ON state of switch 104 may be terminated in response to switch current $I_{SW}$ reaching the current limit threshold.

Controller 102 may be further characterized, according to the teachings of the present invention, to switch power switch 104 at a constant frequency or variable frequency. A constant frequency occurs when each switching period $T_S$ of switch 104 is controlled to be substantially constant. A variable frequency switching period occurs when the switching period $T_S$ of switch 104 is responsive to a feedback signal $U_{FB}$. In one example controller 102 can use a combination of constant frequency or variable frequency modes of operation to regulate an output of power converter 100 depending on the specific operating conditions.

Figure 1B:
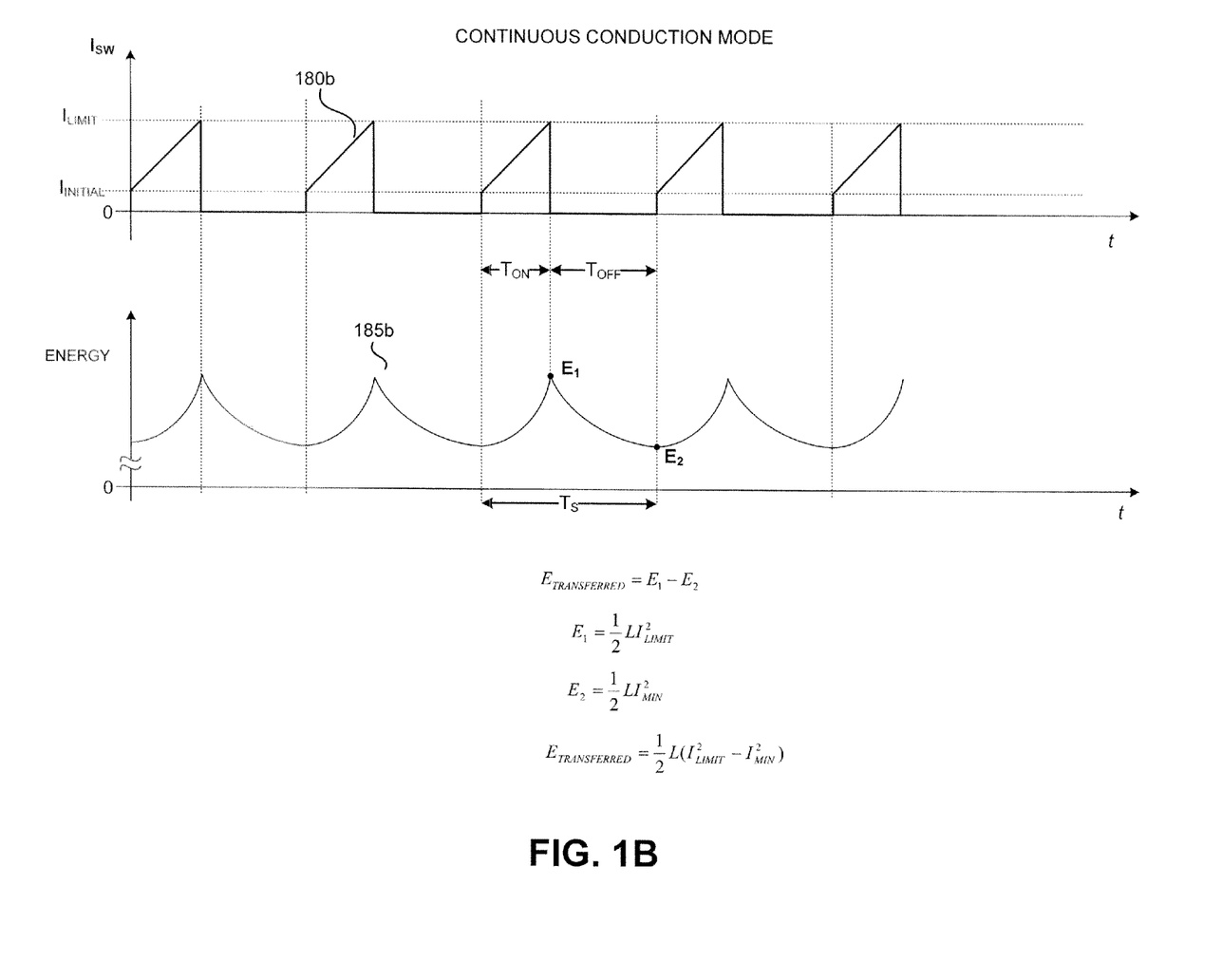
FIG. 1B illustrates a continuous conduction mode waveform of a transformer current, in accordance with the teachings of the present invention.

Referring now to FIG. 1B, waveforms associated with a continuous conduction mode of operation for controller 102 are illustrated in accordance with the teachings of the present invention. As shown, FIG. 1B illustrates a switch waveform 180b and an energy waveform 185b. More specifically switch waveform 180b is representative of a switch current $I_{SW}$ through power switch 104 and energy waveform 185b is representative of the energy stored in energy transfer element 112. As shown in waveform 185b, when operating in continuous conduction mode energy in energy transfer element 112 does not reach zero within a switching period $T_S$ because power switch 104 turns on before all the energy is transferred to the output of power converter 104. In one example, the amount of energy delivered per switching period, when controller 102 is implementing continuous conduction mode, may be quantitatively defined using the following relationship:

$$E_{TRANSFERRED} = E_1 - E_2 \quad (\text{EQ. 1})$$

where $E_1$ is representative of the amount of energy stored at the end of an on time $T_{ON}$ during a switching period $T_S$, and $E_2$ is representative of the amount of energy stored in energy transfer element 112 at the end of an off time $T_{OFF}$ during a switching period $T_S$, as shown in waveform 185b. $E_1$ may be quantitatively defined using the following relationship:

$$E_1 = \tfrac{1}{2} L I_{LIMIT}^2 \quad (\text{EQ. 2})$$

where L is the inductance of primary winding 120, and $I_{LIMIT}$ is the maximum switch current $I_{SW}$ when power switch 104 is able to conduct.

$E_2$ may be quantitatively defined using the following relationship:

$$E_2 = \tfrac{1}{2} L I_{INITIAL}^2 \quad (\text{EQ.3})$$

where L is the inductance of primary winding 120, and $I_{INITIAL}$ is the initial amount of switch current $I_{SW}$ at the beginning of a subsequent enabled cycle.

In one example, controller 102 operates in continuous conduction mode while maintaining a substantially constant switching period $T_S$. As the on time $T_{ON}$ of a constant switching period $T_S$ decreases, the off time $T_{OFF}$ of that constant switching period $T_S$ will increase. More specifically, the on time $T_{ON}$ may be caused to decrease when the input voltage $V_{IN}$ is increased. This may occur because switch current $I_{SW}$ through power switch 104 increases at a faster rate at higher input voltages $V_{IN}$, therefore allowing switch current $I_{SW}$ to reach current limit $I_{LIMIT}$ in a shorter time. Since energy from energy transfer element 112 is delivered to the output of power converter 100 during the off time $T_{OFF}$ of a switching period, the longer the off time $T_{OFF}$, the more energy that is delivered to the output of the power converter during a switching period $T_S$.

In one example, controller 102 operates in continuous conduction mode while maintaining a substantially constant switching period $T_S$. As the on time $T_{ON}$ of a constant switching period $T_S$ decreases, the off time $T_{OFF}$ of that constant switching period $T_S$ will increase. More specifically, the on time $T_{ON}$ may be caused to decrease when the input voltage $V_{IN}$ is increased. This may occur because switch current $I_{SW}$ through power switch 104 increases at a faster rate at higher input voltages $V_{IN}$, therefore allowing switch current $I_{SW}$ to reach current limit $I_{LIMIT}$ in a shorter time. Since energy from energy transfer element 112 is delivered to the output of power converter 100 during the off time $T_{OFF}$ of a switching period, the longer the off time $T_{OFF}$, the more energy that is delivered to the output of the power converter during a switching period $T_S$.

Figure 1C:
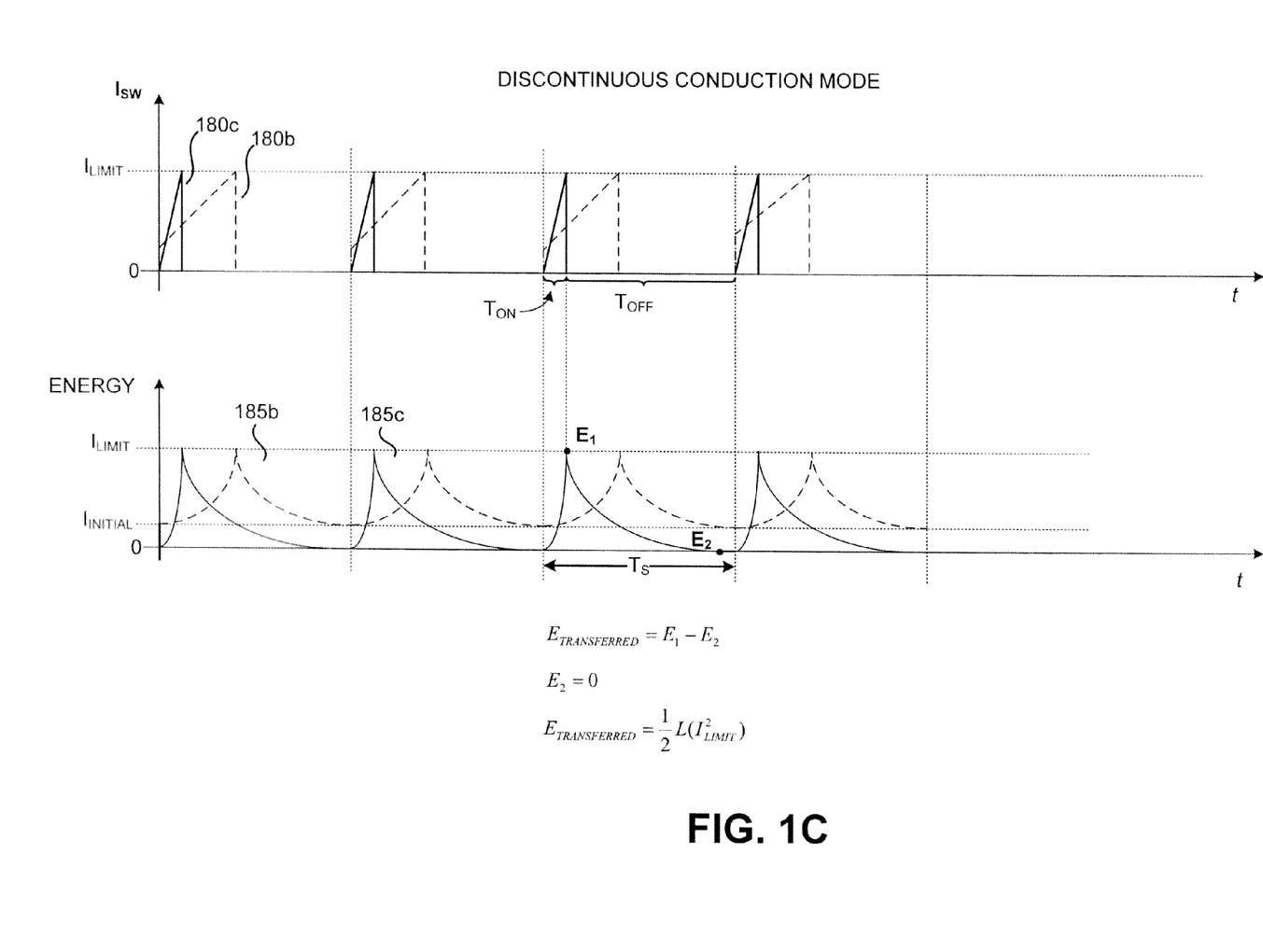
FIG. 1C illustrates discontinuous and continuous conduction mode waveforms of a transformer current, in accordance with the teachings of the present invention.

Referring now to FIG. 1C, a discontinuous conduction mode of operation for controller 102 is illustrated in accordance with the teachings of the present invention. As shown, FIG. 1C illustrates a switch waveform 180c and an energy waveform 185c. More specifically switch waveform 180c is representative of a switch current $I_{SW}$ through power switch 104 and energy waveform 185c is representative of the energy stored in energy transfer element 112 when controller 102 is operating in discontinuous conduction mode. As shown in waveform 185c, when operating in discontinuous conduction mode, all energy in energy transfer element 112 is transferred within a switching period $T_S$. In one example, the amount of energy delivered per switching period $T_S$ when controller 102 is operating in discontinuous conduction mode, may be quantitatively defined using the following relationship:

$$E_{TRANSFERRED} = E_1 - 0 \quad (\text{EQ. 4})$$

where $E_1$ is representative of the amount of energy stored at the end of an on time $T_{ON}$ during a switching period $T_S$, as shown in waveform 185b. $E_1$ may be quantitatively defined using the following relationship:

$$E_1 = \tfrac{1}{2} L I_{LIMIT}^2 \quad (\text{EQ. 5})$$

where L is the inductance of primary winding 120, and $I_{LIMIT}$ is the maximum switch current $I_{SW}$ when power switch 104 is able to conduct.

In one example, controller 102 operates in discontinuous conduction and also maintains a constant switching period $T_S$. During operation, all of the energy received during an on time $T_{ON}$ of a switching period $T_S$ is transferred to the output side of power converter 100 during the off time $T_{OFF}$ of a switching period $T_{OFF}$. In one example, power converter 100 may shift from operating in continuous conduction mode at a certain input voltage to operating in discontinuous conduction mode when power converter 100 is introduced to a substantially higher input voltage. In another example, power converter 100 may be designed to always operate in discontinuous conduction mode. In yet another example, power converter 100 may be designed to always operate in continuous conduction mode.

Referring back to FIG. 1A, power circuit 108 is coupled to power both current offset circuit 106 and controller 102. In another example, current offset circuit 106 may receive a source of power from other circuitry included in power converter 100 or may be separately powered with circuitry specifically designed to power offset current circuit 106. Power signal $U_{POWER}$ may be substantially representative of input voltage $V_{IN}$ and in one example, may be representative of input voltage $V_{IN}$ only during the ON state of power switch 104. That is, in one example, current offset circuit 106 is only able to receive power from power circuit 108 during the ON state of power switch 104.

As further shown in FIG. 1A, current offset circuit 106 is coupled to provide an offset current $I_{OFFSET}$ to power switch 104. A magnitude of offset current $I_{OFFSET}$ may be responsive to a magnitude of power signal $U_{POWER}$. However, as stated above, power signal $U_{POWER}$ may be representative of input voltage $V_{IN}$ and thus, in one example, offset current $I_{OFFSET}$ may be responsive to input voltage $V_{IN}$. In one example, the magnitude of offset current $I_{OFFSET}$ is proportional to a magnitude of input voltage $V_{IN}$. Thus, as input voltage $V_{IN}$ changes, more or less offset current $I_{OFFSET}$ may be provided to power switch 104. For example, offset current $I_{OFFSET}$ may have a first magnitude when input voltage $V_{IN}$ is low and a higher second magnitude when input voltage $V_{IN}$ is relatively higher.

In one example, switch current $I_{SW}$ is the sum of input current $I_{IN}$ and offset current $I_{OFFSET}$. Thus, as the magnitude of offset current $I_{OFFSET}$ increases, the peak value of input current $I_{IN}$ decreases since switch current $I_{SW}$ is limited. The equation below further illustrates the relationship between input current $I_{IN}$, offset current $I_{OFFSET}$, and switch current $I_{SW}$.

$$I_{SW} = I_{IN} + I_{OFFSET} \quad (\text{EQ. 6})$$

Based on the above relationship, as offset current $I_{OFFSET}$ is increased input current $I_{IN}$ will decrease. Since input current $I_{IN}$ is directly related to the amount of power transferred during each switching period $T_S$, when input current $I_{IN}$ is reduced due to offset current $I_{OFFSET}$, less energy is transferred by energy transfer element during each switching period $T_S$. In this manner, maximum energy delivery through energy transfer element 112 is controlled by the amount of offset current $I_{OFFSET}$ flowing through switch 104 during each switching period $T_S$. Since, in one example, the magnitude of offset current $I_{OFFSET}$ is determined in response to the magnitude of input voltage $V_{IN}$, the energy delivery through energy transfer element 112 per switching period $T_S$ is effectively controlled in response to input voltage $V_{IN}$.

Furthermore, as offset current $I_{OFFSET}$ is adjusted so too is the current sense signal $I_{SENSE}$. For example, based on EQ. 6 above, as offset current $I_{OFFSET}$ is increased, input current $I_{IN}$ will decrease. Since current sense signal $I_{SENSE}$ is representative of the switch current $I_{SW}$, the current sense signal $I_{SENSE}$ will indicate that the current limit threshold has been reached for lower peak values of the input current $I_{IN}$ with the noted increase in offset current $I_{OFFSET}$. Thus, as the current sense signal $I_{SENSE}$ is adjusted, so too is a peak magnitude of the input current $I_{IN}$ (e.g., the peak magnitude of input current $I_{IN}$ is reduced as more offset current $I_{OFFSET}$ is generated to shift the current sense signal $I_{SENSE}$). Accordingly, in the illustrated embodiment, the maximum output power of power converter 100 may be limited by generating offset current $I_{OFFSET}$ to adjust the current sense signal $I_{SENSE}$ in response to changes in the input voltage $V_{IN}$.

In one example, power converter 100 may be designed to limit maximum power required to load 119. In the example power converter 100, load 119 may require a maximum output voltage $V_{OUT}$ of 5 V and a maximum output current $I_{OUT}$ of 3 A representing a maximum output power of 15 W. However, due to customer requirements, it may be necessary to limit a maximum power that can be delivered under any scenario, to less than 25 W. In one example, during a low input voltage condition the power converter may not be capable of outputting more than the maximum power limit during a fault condition. In another example, if the output of power converter 100 is shorted during a high input voltage condition, output power of power converter 100 is limited in accordance with the teachings of the present invention. More specifically, during high input voltage conditions power converter 100 may be able to output more than 25 W during a fault condition if output power of power converter 100 is not limited in accordance with the teachings of the present invention. In one example, a fault condition may be that the output of the power converter 100 is shorted. In another example, a fault condition may be that controller 102 fails to receive feedback signal $U_{FB}$. According to the teachings of the present invention, an offset current $I_{OFFSET}$ is provided to limit the amount of energy transferred during a switching period $T_S$ or in other words limit the power delivered to the output of power converter 100. For example, if power converter 100 is coupled to a relatively low input voltage, for example 85 V ac, current offset circuit 106 may provide a minimal if not a substantially zero offset current $I_{OFFSET}$ to switch 104. Thus, the input current $I_{IN}$ is substantially equal to switch current $I_{SW}$ during each switching period $T_S$. Continuing with the example, if power converter 100 is coupled to a relatively high input voltage, offset current circuit 106 will provide a substantial amount of offset current $I_{OFFSET}$ to switch 104. In this manner, during a fault condition where the power converter 100 loses regulation at the output and switches at maximum frequency, maximum power delivered to the output is limited by offset current $I_{OFFSET}$. These and other examples of current limit offsetting in a power converter are disclosed in more detail below.

Figure 2:
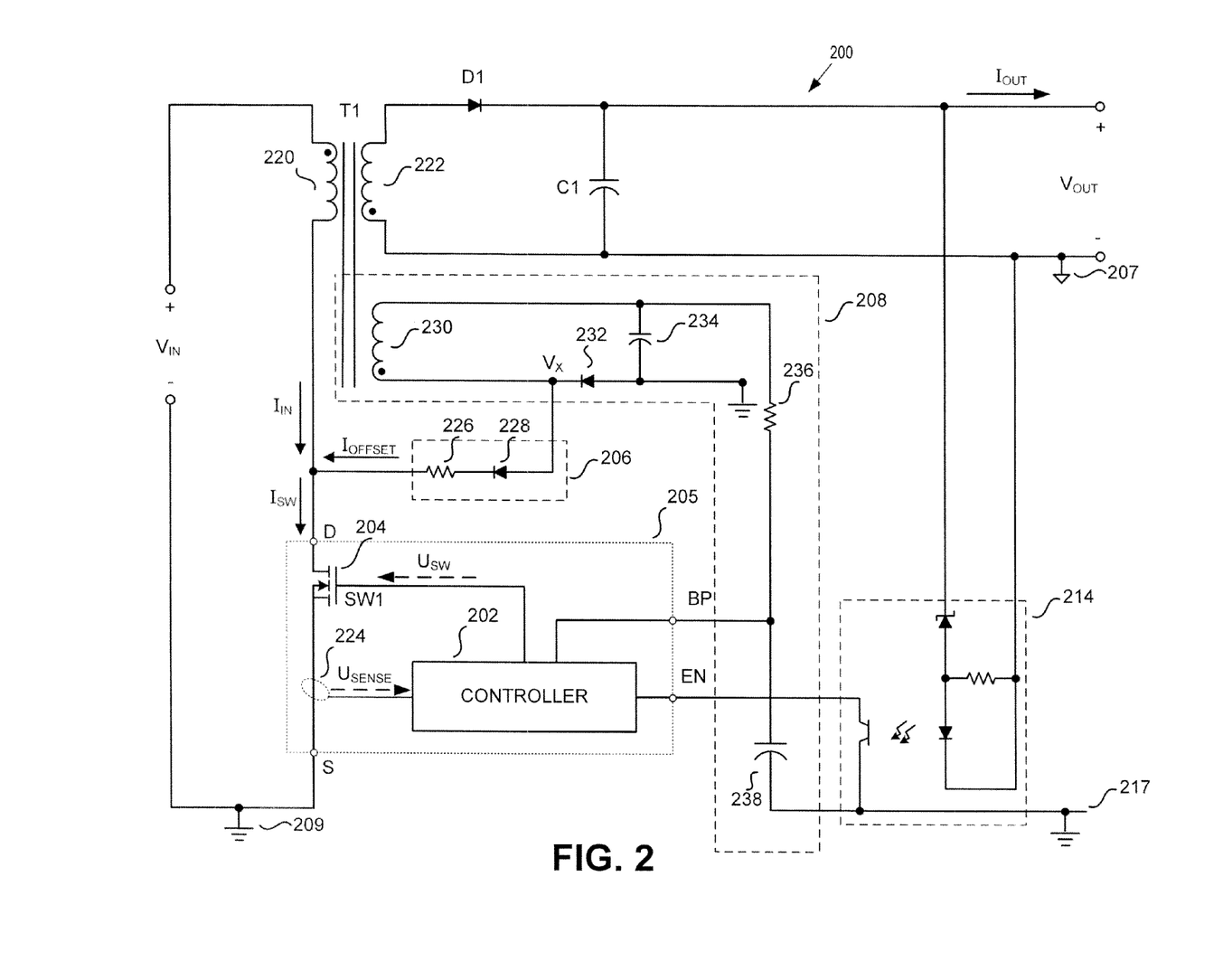
FIG. 2 is a functional block diagram illustrating an example power converter including an integrated circuit, in accordance with the teachings of the present invention.

FIG. 2 is a functional block diagram illustrating an example power converter 200, in accordance with the teachings of the present invention. The illustrated example of power converter 200 includes a controller 202, a power switch 204, a current offset circuit 206, a power circuit 208, a feedback circuit 214, and a current sensor 224. Controller 202, power switch 204, current offset circuit 206, power circuit 208, feedback circuit 214, and current sense 224 represent possible implementations of controller 102, power switch 104, current offset circuit 106, power circuit 108, feedback circuit 114, and current sense 224, respectively of FIG. 1A.

The illustrated example of current offset circuit 206 includes a resistor 226 and a diode 228. The illustrated example of power circuit 108 includes an auxiliary winding 230, a diode 232, a bias winding capacitor 234, a resistor 236 and a bypass capacitor 238.

As shown in FIG. 2, resistor 226 and diode 228 are coupled in series between auxiliary winding 230 and a drain terminal D of power switch 204. In particular, offset current $I_{OFFSET}$ flows through both resistor 226 and diode 228. In one example, auxiliary winding 230 is magnetically coupled to primary winding 220, such that auxiliary winding voltage $V_X$ is substantially representative of input voltage $V_{IN}$ at least during the ON state of power switch 204. In one example, the voltage at the anode of diode 228 is substantially equal to auxiliary winding voltage $V_X$ with respect to the voltage at the anode of diode 232. In one example, current offset circuit 206 supplies offset current $I_{OFFSET}$ only during the ON state of power switch 204.

As is further shown in FIG. 2, controller 202 and power switch 140 could form part of an integrated circuit 205 that is manufactured as either a hybrid or a monolithic integrated circuit. Current sense 224 may also form part of integrated circuit 205. In power converter 200, bypass capacitor 238 is coupled to a bypass terminal of integrated circuit 205. In operation, bias winding capacitor 234 is coupled to provide energy to bypass capacitor 238.

Figure 3:
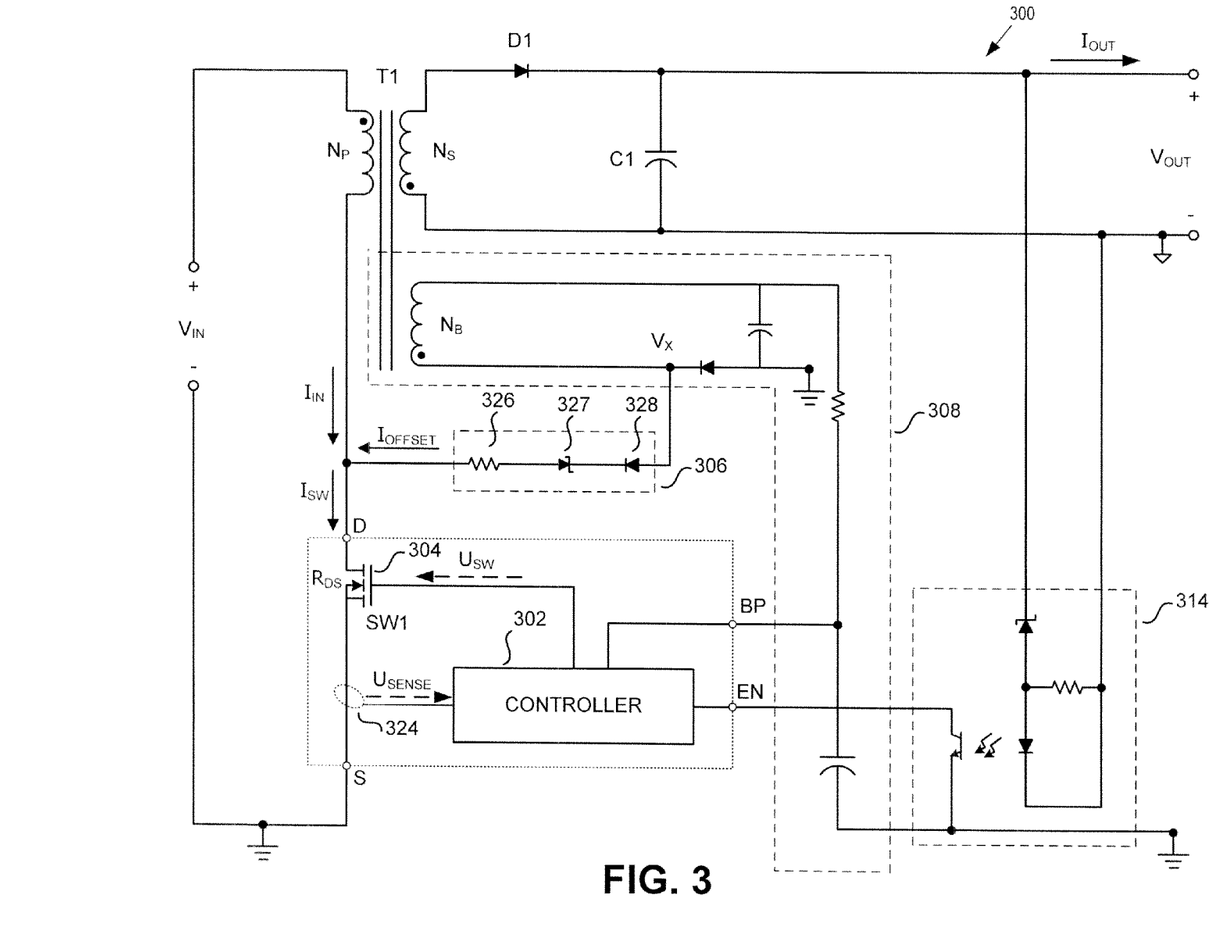
FIG. 3 is a functional block diagram illustrating an example power converter, in accordance with the teachings of the present invention.

FIG. 3 is a functional block diagram illustrating an example power converter 300, in accordance with the teachings of the present invention. The illustrated example of power converter 300 includes a controller 302, a power switch 304, a current offset circuit 306, a power circuit 308, a feedback circuit 314, and a current sensor 324. Controller 302, power switch 304, current offset circuit 306, power circuit 308, feedback circuit 314, and current sense 324 represent possible implementations of controller 102, power switch 104, current offset circuit 106, power circuit 108, feedback circuit 114, and current sense 224, respectively of FIG. 1. The illustrated example of current offset circuit 306 includes a resistor 326, a Zener diode 327 and a diode 328.

The structure of power converter 300 is similar to that of power converter 200 described above with reference to FIG. 2, with the exception of the addition of Zener diode 327 coupled in series with resistor 326 and diode 328. With changes in temperature of power converter 300, the drain-to-source resistance $R_{DS}$ of power switch 304 may correspondingly change. For example, as temperature increases, the drain-to-source resistance $R_{DS}$ may also increase. Therefore, as the drain-to-source resistance $R_{DS}$ increases the offset current $I_{OFFSET}$ may be undesirably reduced with increasing temperatures. Thus, Zener diode 327 may be added to current offset circuit 306 of reduce or eliminate the effects of resistance changes of $R_{DS}$ in power switch 304 due to temperature variances. More specifically, Zener diode 327 may include a breakdown voltage that decreases as temperature of switch 304 increases, thus maintaining a substantially constant offset current $I_{OFFSET}$. In other words Zener diode 327 is selected to have a negative temperature coefficient that negates the positive temperature coefficient of the $R_{DS}$ of power switch 104. A temperature coefficient may be defined as the amount of change in the value of a parameter. For example, a resistance having a positive temperature coefficient would see an increase in resistance with rise in temperature and a resistance having a negative temperature coefficient would see decrease in resistance with rise in temperature.

Typically, Zener diodes with a breakdown voltage of less than or equal to about 6.2 volts have a negative temperature coefficient. Therefore, in one example multiple Zener diodes 328 (not shown) may be included in offset circuit 306 coupled in series to create a greater breakdown voltage to permit offset current $I_{OFFSET}$ to flow to power switch 104 while still incorporating this temperature compensation technique. In one example, according to the teachings of the present invention, Zener diode 327 has a breakdown voltage that is less than about 6.2 volts.

Figure 4A:
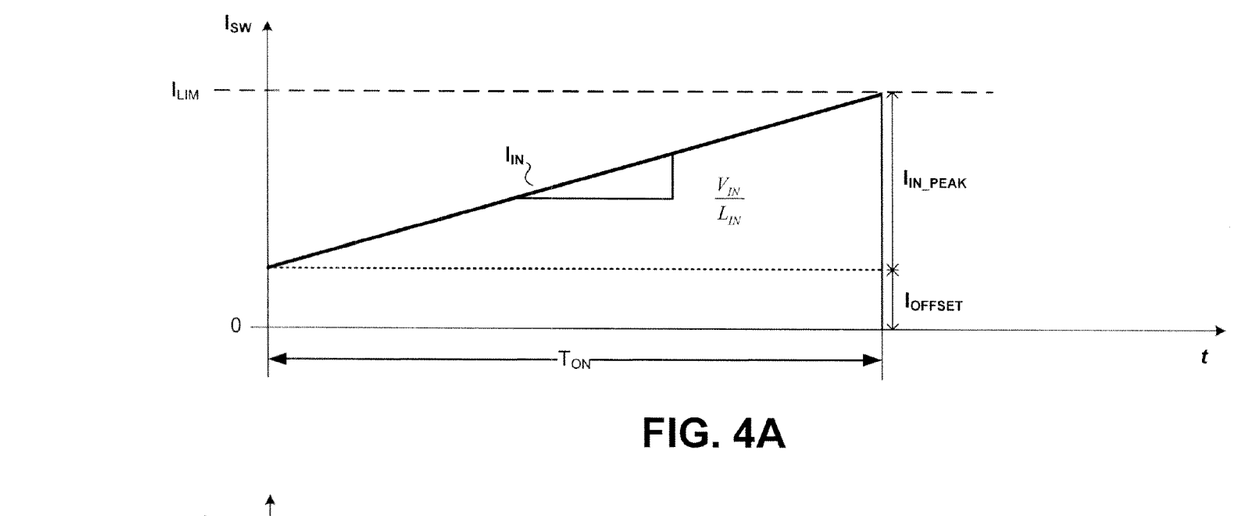
FIG. 4A is a graph illustrating an effect of a current limit offset on switch current, in accordance with the teachings of the present invention.

FIG. 4A is a graph illustrating an effect of a current limit offset $I_{OFFSET}$ on switch current $I_{SW}$, in accordance with the teachings of the present invention. As can be seen from FIG. 4A, switch current $I_{SW}$ is substantially equal to the sum of input current $I_{IN}$ and current limit offset $I_{OFFSET}$. As can be further seen from FIG. 4A, if current limit offset $I_{OFFSET}$ were increased, the peak value of input current $I_{IN}$ (i.e., peak input current $I_{IN\_PEAK}$) necessary for switch current $I_{SW}$ to reach a threshold current limit $I_{LIM}$ would be further reduced.

Figure 4B:
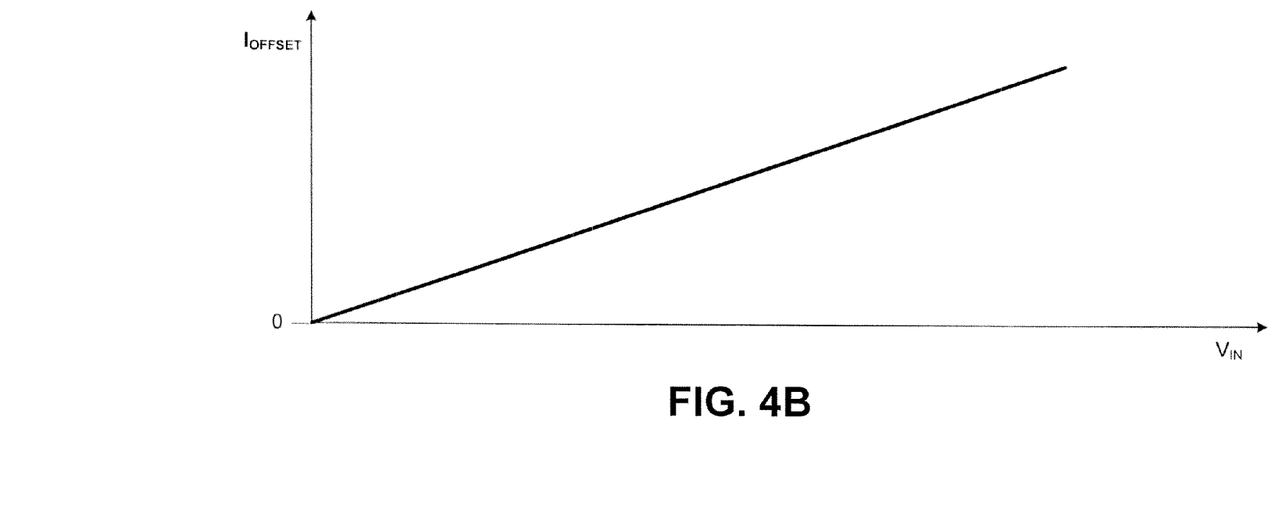
FIG. 4B is a graph illustrating a relationship between input voltage and current limit offset, in accordance with the teachings of the present invention.

FIG. 4B is a graph illustrating a relationship between input voltage $V_{IN}$ and current limit offset $I_{OFFSET}$, in accordance with the teachings of the present invention. As can be seen for FIG. 4B, current limit offset $I_{OFFSET}$ may be configured to adjust linearly proportional to input voltage $V_{IN}$. Thus, as the input voltage $V_{IN}$ to a power converter increases the amount of input current $I_{IN}$ needed to reach current limit threshold $I_{LIM}$ is correspondingly reduced. Thus, the operation of a power converter (e.g., power converter 100, 200, 300, etc.) may be configured to safely operate with multiple ranges of input voltages. It is appreciated that in other examples the relationship between $I_{OFFSET}$ and $V_{IN}$ shown in FIG. 4b could be non-linear in nature or could be a piecewise linear characteristic.

Figure 5:
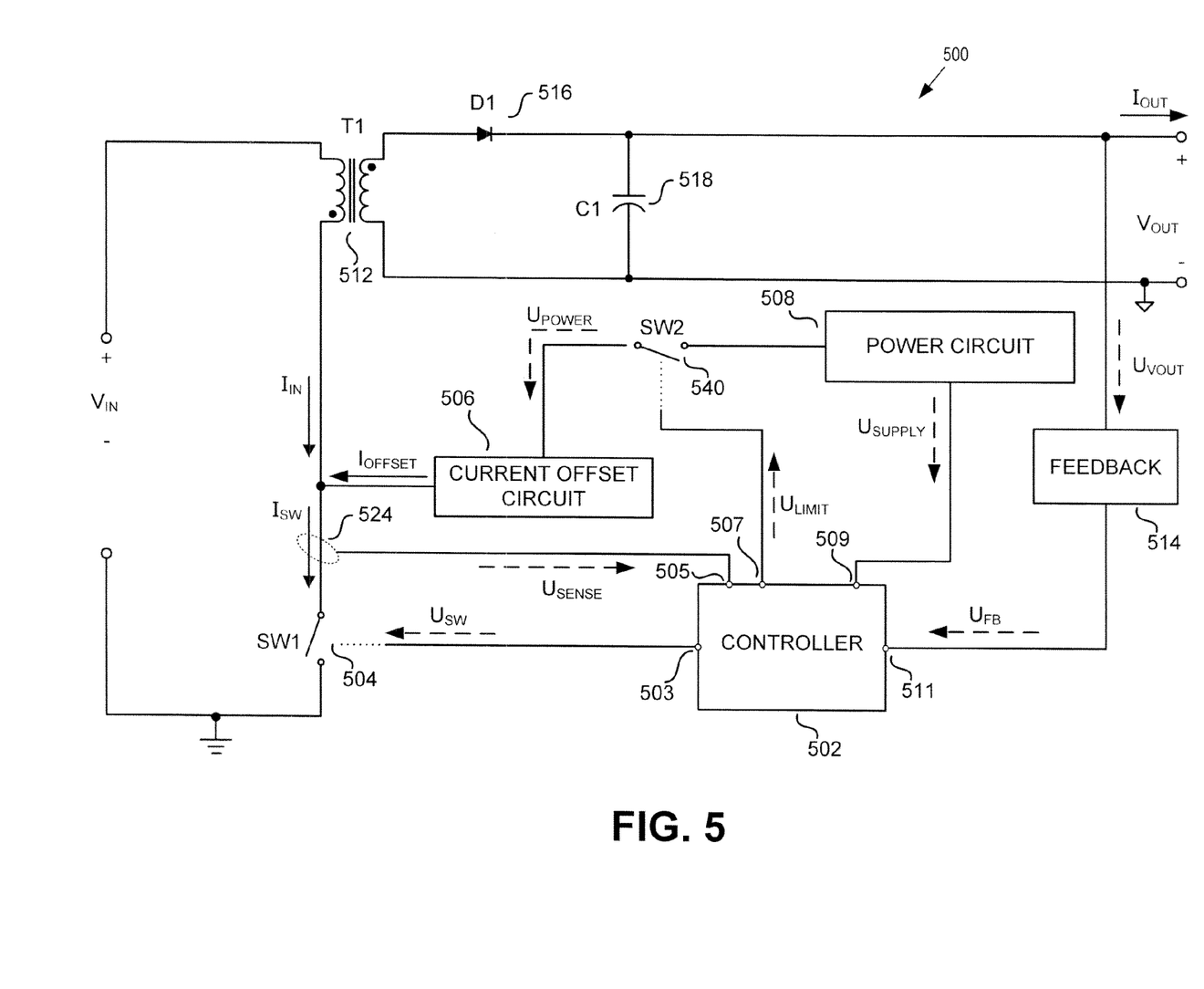
FIG. 5 is a functional block diagram illustrating an example power converter including an example controller, in accordance with the teachings of the present invention.

FIG. 5 is a functional block diagram illustrating an example power converter 500 and an example controller 502, in accordance with the teachings of the present invention. The illustrated example of power converter 500 includes a controller 502, a power switch 504, a current offset circuit 506, a power circuit 508, an energy transfer element 512, a feedback circuit 514, an output diode 516, an output capacitor 518, a current sensor 524, and a power limit switch 540.

In one example, controller 502 is an integrated circuit controller with external terminals (e.g., including but not limited to 503, 505, 507, 509, and 511.) As shown in the example of FIG. 5, integrated circuit controller 502 includes a drive terminal 503, a current sense terminal 505, a current limit offset terminal 507, a supply terminal 509 and a feedback terminal 511.

As shown in FIG. 5, drive terminal 503 is coupled to provide a switching signal $U_{SW}$ to power switch 504 in one example to regulate either or both of an output voltage $V_{OUT}$ or an output current $I_{OUT}$ of power converter 500. Current sense terminal 505 is coupled to receive the current sense signal $U_{SENSE}$ from current sense 524. In one example, current sense signal $U_{SENSE}$ is representative of switch current $I_{SW}$ flowing through power switch 504. Feedback terminal 511 is shown as coupled to receive feedback signal $U_{FB}$ from feedback circuit 514. In one example, feedback signal $U_{FB}$ is representative of an output voltage $V_{OUT}$ of power converter 500.

Controller 502, may regulate the output of power converter 500 in response to feedback signal $U_{FB}$. Power converter controller 502 may also implement a current limit control responsive to current sense signal $U_{SENSE}$ where controller 502 disables power switch 504 from being switched if switch current $I_{SW}$ reaches a current limit threshold. However, as discussed above, the current limit of controller 502 may be offset by current offset circuit 506. The inclusion of current limit offset terminal 507 and power limit switch 540 allows controller 502 to selectively disable or enable current offset circuit 506. For example, in FIG. 5, power limit switch 540 is coupled between power circuit 508 and current offset circuit 506. Thus, when power limit switch 540 is enabled current offset circuit 506 is powered, while it is unpowered when switch 540 is not conducting (i.e., open).

In one example, controller 502 enables power limit switch 540 in response to controller 502 regulating a maximum output power of at the output power converter 500. Controller 502 may also enable power limit switch 540 to limit power delivery in response to a fault condition detected by controller 502. In another example, controller 502 may be configured to enable power limit switch 540 in response to an ambient temperature condition of power converter 500 (e.g., temperature too high.)

Figure 6:
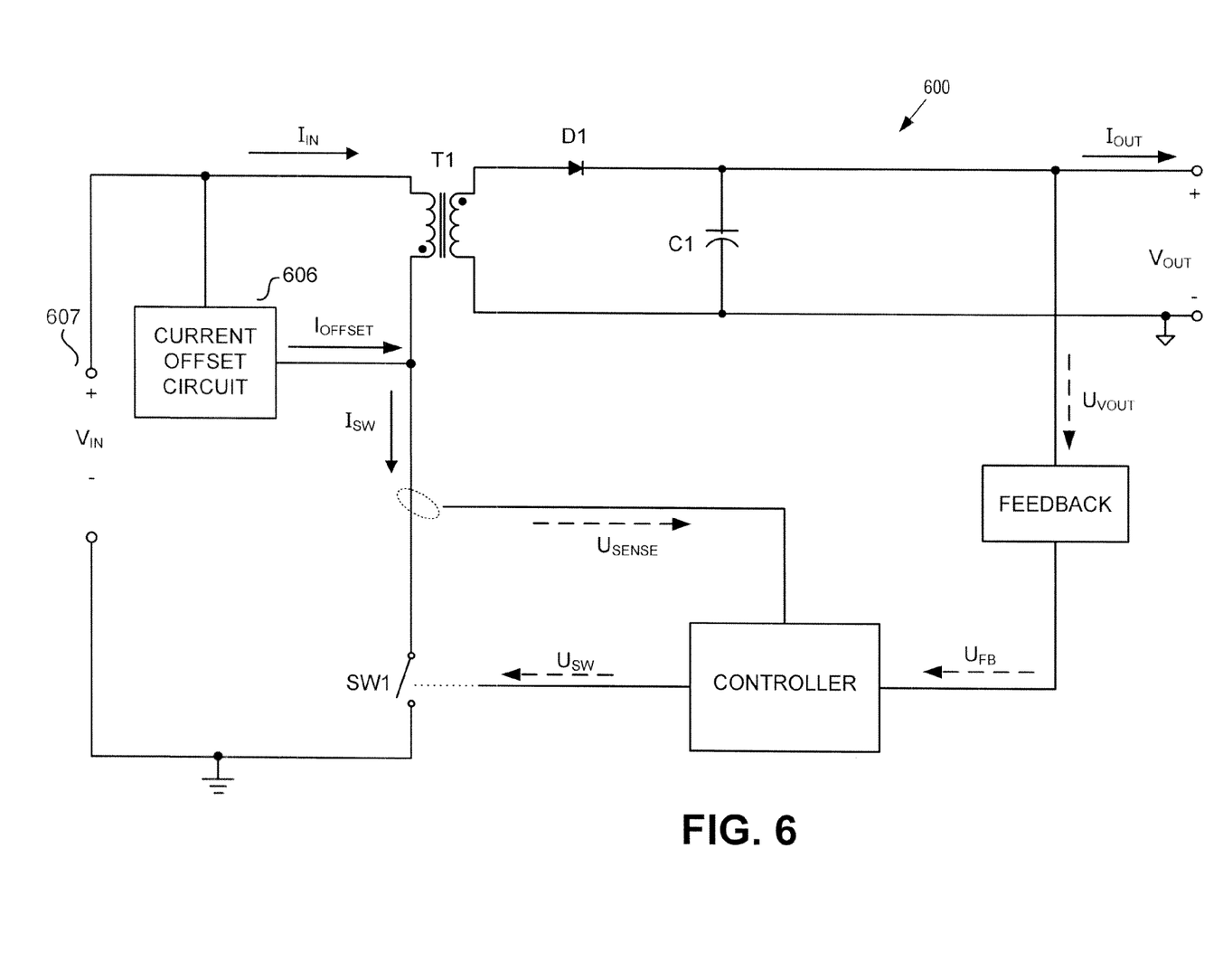
FIG. 6 is a functional block diagram illustrating an example power converter, in accordance with the teachings of the present invention.

FIG. 6 is a functional block diagram illustrating an example power converter 600, in accordance with the teachings of the present invention. The structure and operation of power converter 600 is similar to that of power converter 100 described above with reference to FIG. 1A, with the exception that power circuitry 108 includes coupling current offset circuit 606 to an input terminal 607. In particular, current offset circuit 606 is coupled to be powered directly from input voltage $V_{IN}$ and to provide current offset signal $I_{OFFSET}$ that is responsive to a magnitude of input voltage $V_{IN}$.

As discussed above, a current offset circuit may be included in a power converter to allow the power converter to safely limit a maximum output power when the power converter operates over multiple ranges of input voltages $V_{IN}$. For example, a power converter, in accordance with the teachings of the present invention, may be configured, through design of current offset circuit 506, to operate with a first input voltage range of 85 V ac to 132 V ac and with a second input voltage range of 170 V ac to 235 V ac without the need for a controller that includes a dedicated pin for detecting the magnitude of the input voltage or a dedicated pin for adjusting a power switch current limit threshold.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power converter, comprising:
an energy transfer element having an input winding coupled to an input of the power converter and an output winding coupled to an output of the power converter;
a switch coupled to the input winding to control a transfer of energy from the input to the output of the power converter;
a controller coupled to switch the switch between an ON state and an OFF state to regulate the output of the power converter, wherein the controller is adapted to terminate the ON state of the switch in response to a switch current flowing through the switch reaching a switch current threshold; and
a current offset circuit coupled to the input to be directly powered from an input voltage of the power supply, wherein the current offset circuit generates an offset current to flow through the switch only during the ON state of the switch in response to a magnitude of the input voltage, wherein an input current of the power converter is adjusted in response to the offset current.

2. The power converter of claim 1, wherein a peak magnitude of the input current is adjusted in response to the offset current.

3. The power converter of claim 1, wherein a sum of the offset current and the input current during the ON state of the switch is substantially equal to the switch current.

4. The power converter of claim 1, further comprising a current sensor coupled to sense the switch current and to provide a current sense signal representative of the switch current to the controller.

5. The power converter of claim 1, wherein the current offset circuit comprises a resistor and a diode.

6. The power converter of claim 5, wherein the resistor and the diode are coupled such that the offset current flows through both the resistor and the diode.

7. The power converter of claim 5, wherein the current offset circuit further comprises a zener diode coupled such that the offset current flows through the resistor, the diode and the zener diode.

8. The power converter of claim 7, wherein the zener diode has a negative temperature coefficient.

9. The power converter of claim 7, wherein a breakdown voltage of the zener diode decreases as temperature increases.

10. The power converter of claim 9, wherein the breakdown voltage of the zener diode is less than about 6.2 Volts.

11. The power converter of claim 1, further comprising a feedback circuit coupled to output a feedback signal to the controller, wherein the feedback signal is responsive to an output voltage at the output of the power converter.

12. The power converter of claim 1, wherein the controller is adapted to regulate a constant voltage over a range of output currents.

13. The power converter of claim 1, wherein the controller is adapted to operate in a continuous conduction mode during a first input voltage of the power converter and to operate in a discontinuous conduction mode during a second input voltage, wherein the second input voltage is greater than the first input voltage.

14. The power converter of claim 1, wherein the controller is adapted to operate in a discontinuous conduction mode when an input voltage of the power supply is substantially low.

15. The power converter of claim 1, wherein the current offset circuit is adapted to adjust the offset current linearly in response to a change in the input voltage of the power converter.

16. The power converter of claim 1, wherein the switch and the controller are integrated into a single monolithic integrated device.

* * * * *